May 1, 1956  C. W. MARTIN  2,743,767
RIM CLAMP AND JACK DEVICE FOR TIRE TOOLS
Filed Jan. 2, 1952  3 Sheets-Sheet 1
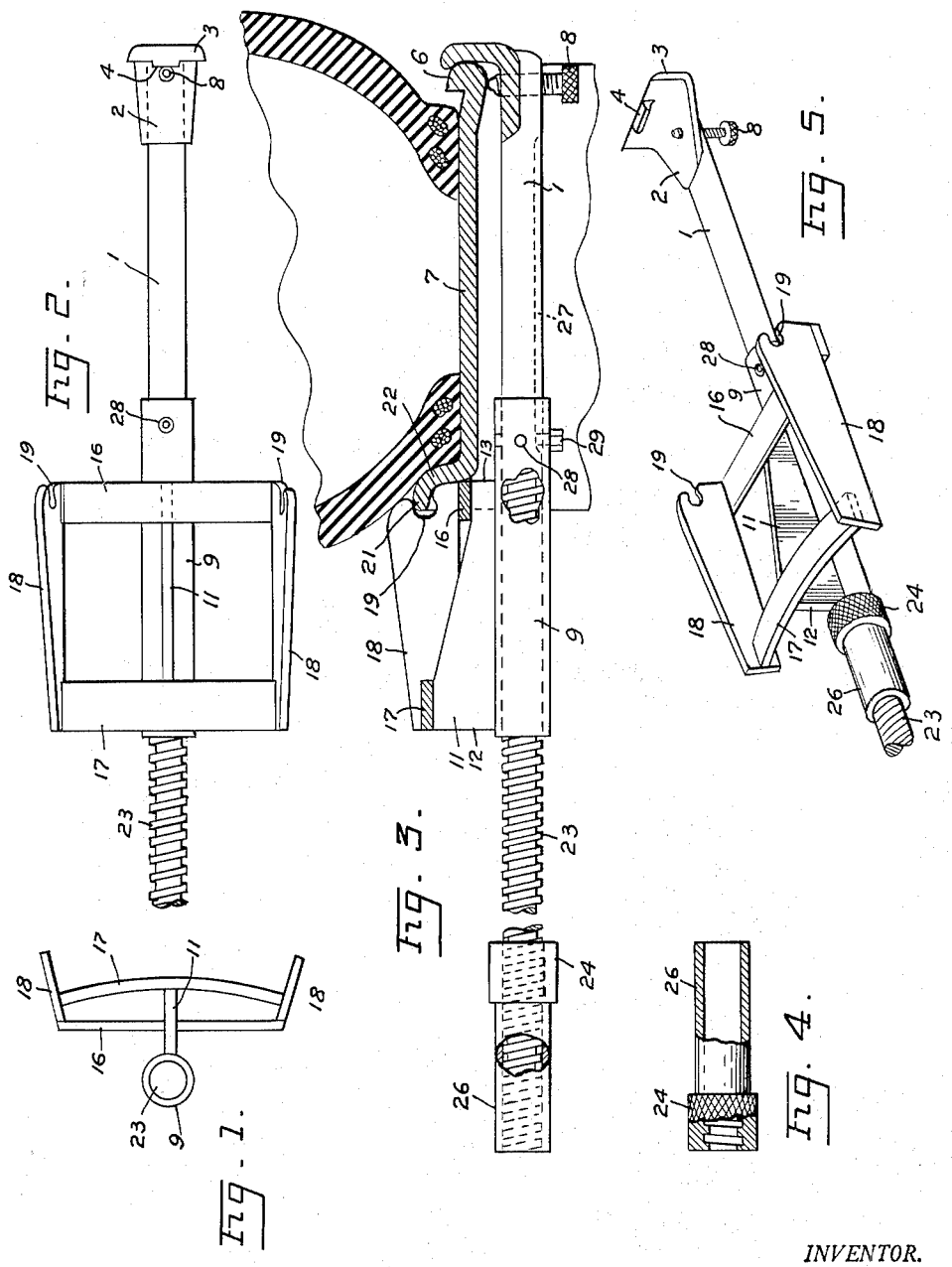
INVENTOR.
CLAUDE W. MARTIN
BY George B White
ATTORNEY

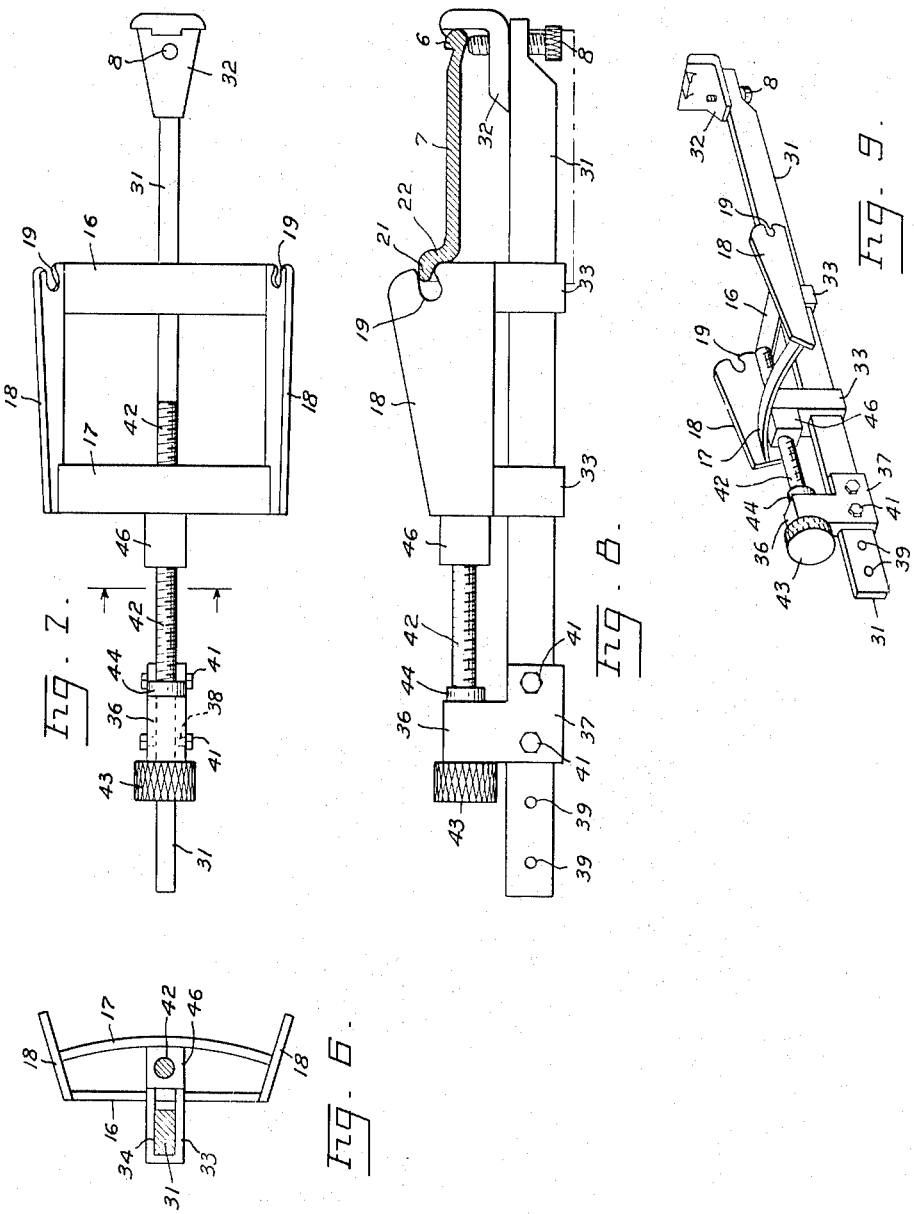

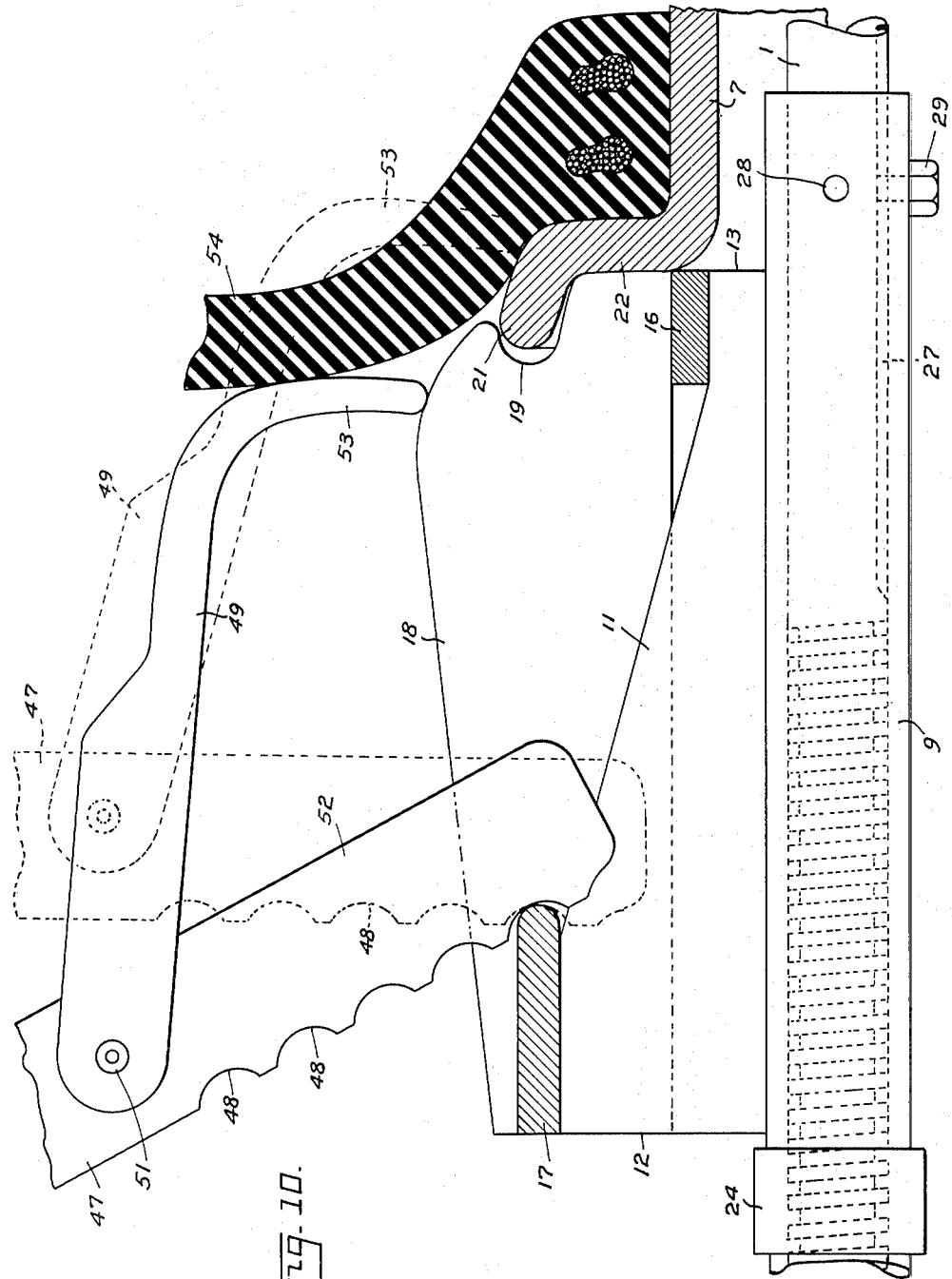

United States Patent Office 2,743,767
Patented May 1, 1956

2,743,767
RIM CLAMP AND JACK DEVICE FOR TIRE TOOLS
Claude W. Martin, Gold Hills, Oreg.
Application January 2, 1952, Serial No. 264,542
5 Claims. (Cl. 157—1)

This invention relates to a jack device for tire tools for loosening tires from a wheel rim.

The primary object of the invention is to provide a jack clamp which can be quickly clamped on a wheel rim to provide increased leverage for tire tools for breaking down or loosening a tire frozen to the wheel rim, and which can be easily shifted around the wheel rim periphery to loosen the tire all around the rim. This device is particularly adapted to be used in connection with the type of tire tools shown in my Patent No. 2,317,072 granted on April 20, 1943 on Tire Tool and Patent No. 2,545,483 granted on March 20, 1951 on Tire Bead and Retaining Ring Tool.

The novel features of my device include: clamp jaws for quickly and securely clamping the device on the wheel rim and against the opposite bead and rim flange so as to quickly shift it around the rim; adjustability of the jaws for rims of different widths; quickly releasable means to hold the jaws in clamping position; leverage or fulcrum members so held on the device as to be engageable by the tire tool and provide firm fulcrum backing for the prying operation laterally in line with the tire rim; the arrangement of backing member so as to allow insertion of the tire tool to any selected leverage so as to maintain said tool at a substantially constant angle.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is an end view of my device.

Fig. 2 is a top plan view of my device.

Fig. 3 is a fragmental, partly sectional side view of my device in operating position on the wheel rim.

Fig. 4 is a detail view of the reversible clamping nut for my device.

Fig. 5 is a perspective view of my jack clamp.

Fig. 6 is a sectional end view of a modified form of my device, taken along the line 6—6 of Fig. 7.

Fig. 7 is a top plan view of said modified form.

Fig. 8 is a side view of said modified form on a wheel rim.

Fig. 9 is a perspective view of said modified form, and

Fig. 10 is a somewhat diagrammatic sectional view showing my device with a prying tool in operation.

In my device I provide a jack bar 1 with a wide shoe 2 at an end thereof. A vertical flange 3 on the shoe 2 forms a jaw with a tongue tip 4 turned back toward the jack bar so as to fit over the bead 6 of a wheel rim 7. A set screw 8 extended through the base of the shoe 2 upwardly bears against the inner periphery of the bead 6 so as to suitably space the jack bar 1 from the inner periphery of the wheel rim 7.

A sleeve 9 is slidable over the other end of the jack bar 1. An integral rib 11 along the top of the sleeve 9 has an inclined top edge rising away from the shoe end of the jack bar 1. The higher end 12 and the lower end 13 of the edge of the rib 11 is straight. A lower cross plate or cross bar 16 is integral with the rib 11 and extends transversely across the lower straight end 13. A leverage or higher cross plate or bar 17 is integral with the rib and extends across the rib 11 spaced from and parallel with the lower cross bar 16.

A pair of spaced jaw plates 18 parallel with the jack bar 1 are integrally held on the respective ends of the cross bars 16 and 17 so that each jaw plate 18 is vertical with respect to the cross plates 16 and 17. An edge of each jaw plate 18 faces toward the shoe 2 and has a rounded notch 19 therein fitting over the outward bead 21 of the rim flange 22. Thus as the shoe 2 is fitted over the rim bead 6 and the jaw plate notches 19 are held tightly over the flange bead 21 the jack is firmly clamped in place.

The free end 23 of the jack bar 1 is threaded. The sleeve 9 is slidable on the thread end 23. A clamp nut 24 is threaded on said threaded end 23 so as to bear against the outer end of the sleeve 9 and pull on the jack bar 1 for firmly holding the jaw flange 6 and the jaw plates 19 against the opposite edges of the rim. This clamp nut has a long bushing 26 extended therefrom slidably over said threaded end 23 so as to allow reversing of the nut and the suitable spacing of the nut from the end of the sleeve 9, according to the width of the wheel rim.

The jack bar 1 has a longitudinal key slot 27 in a side thereof. The sleeve 9 has in its inner end four threaded holes 28 at right angles to one another. A set screw 29 is secured in the hole 28 opposite the key slot 27 and projects into the latter to prevent the turning of the sleeve relatively to the jack bar 1. Thus the sleeve 9 and the leverage backing structure thereon may be adjusted to various selected angles with respect to the fixed jaw or shoe 2 to suit certain types of wheel rims.

In the modified form shown in Figs. 6 to 9 inclusive, a jack bar 31 is of rectangular cross section. A shoe 32 on an end of this jack bar 31 is formed into a jaw similarly to shoe 2 heretofore described. The lower and higher cross bars 16 and 17, in this form, each has thereon an integral base 33 extended downwardly. Each base 33 has a rectangular hole 34 therethrough slidably fitting over the jack bar 31. A bracket 36 has a forked base 37 straddling the jack bar 31, and has a pair of bolt holes 38 therethrough aligned with holes 39 through sides of said jack bar 31 so as to accommodate bolts 41 for securing the bracket 36 on the free end of the jack bar 31. There are a series of such holes 39 through the jack bar 31 to allow setting of the bracket 36 at selected spacing from the jaws 18.

An adjusting screw 42 is rotatably held in said bracket 36 by a knurled head 43 on the outside of the bracket 36 and by a fixed collar 44 on the screw 42 on the other side of the bracket 36 so as to hold the screw 42 stationary. The screw 42 is threaded into a threaded traveling nut or hub 46 integral with the bases 33 of the higher cross bar 17. As the screw 42 is turned the traveling hub 46 moves thereon and shifts with it the bases 33 and the jaw structure thereon longitudinally along the jack bar 31, for clamping or releasing the jack device on a wheel rim for the purposes heretofore described.

As illustrated in Fig. 10 a hand lever 47 has a plurality of spaced notches 48 on an edge thereof, and a prying member 49 mounted on a fulcrum 51 on the hand lever 47 above said series of notches 48 so as to extend beyond the edge 52 of the lever 47 oppositely to the notches 48. The free end of the prying member is formed into a hook 53 curved toward the notched end of the hand lever 47. This tool is inserted and engaged with the jack device heretofore described for pressing the hook 53 against the side of a tire 54 above the wheel rim flange 22 for pushing the tire away from said wheel rim flange.

In operation the jack device is clamped on the wheel rim as heretofore described. Then the selected notch 48, preferably the notch nearest the end of the lever, is engaged with the inner edge of the higher cross bar or lever bar 17 and then the hand lever 47 is turned and pressed toward the tire 54 pressing the hook 53 thereagainst. Then the successive higher notches 48 are engaged one by one with the higher cross bar 17 offering leverage for further pushing and lowering the fulcrumed hook 53 until the tire is loosened so that the hook 53 enters between the rim flange 22 and the tire 54. This action is permitted by the fulcruming of said prying member 49. As the tire is loosened from the rim flange at one place, the jack device is released and shifted along the rim periphery, and the operation is repeated until the tire is loosened all around the rim. In this manner any frozen tire can be quickly loosened with a minimum effort and force.

I claim:

1. A leverage jack for tire removing tools comprising a bar, a jaw on one end of the bar adapted to engage the outer periphery on one side of a tire wheel rim, a jaw device slidable on said bar and adapted to engage the outer periphery of the outer side of said wheel rim, releasable means to clamp said jaws against said opposite sides of the wheel rim and to hold the same in place, said movable jaw device comprising a sleeve slidable longitudinally on said bar, a pair of spaced transverse bars fixedly connected to said sleeve, a pair of clamping plates on the ends of said transverse bars extending generally parallel with and on opposite sides of said first bar, each of said plates having on the edge thereof facing toward the other jaw sockets for engaging the adjacent periphery of the tire wheel rim, the spacing between said transverse bars being such as to permit the insertion therebetween of the leverage member of a tire removing tool for engagement with the inside edge of one of said transverse bars, said first jaw being fixed on the end of said first bar, and an adjustable aligning member extended through the end of the first bar to engage the underside of said wheel rim for aligning and spacing said first bar with respect to said wheel rim.

2. A leverage jack for tire removing tools comprising a bar, a jaw on one end of the bar adapted to engage the outer periphery on one side of a tire wheel rim, a jaw device slidable on said bar and adapted to engage the outer periphery of the outer side of said wheel rim, releasable means to clamp said jaws against said opposite sides of the wheel rim and to hold the same in place, said movable jaw device comprising a sleeve slidable longitudinally on said bar, a pair of spaced transverse bars fixedly connected to said sleeve, a pair of clamping plates on the ends of said transverse bars extending generally parallel with and on opposite sides of said first bar, each of asid plates having on the edge thereof facing toward the other jaw sockets for engaging the adjacent periphery of the tire wheel rim, the spacing between said transverse bars being such as to permit the insertion therebetween of the leverage member of a tire removing tool for engagement with the inside edge of one of said transverse bars, said first jaw being fixed on the end of said first bar, an adjustable aligning member extended through the end of the first bar to engage the underside of said wheel rim for aligning and spacing said first bar with respect to said wheel rim, and means to prevent the relative angular movement between said sleeve and said first bar.

3. A leverage jack for tire removing tools comprising a bar, a jaw on one end of the bar adapted to engage the outer periphery on side of a wheel rim, a jaw device slidable on said bar and adapted to engage the outer periphery of the other side of said wheel rim, releasable means to clamp said jaws against said opposite sides of the wheel rim and to hold the same in place, said movable jaw device comprising base members slidable longitudinally on said bar, a pair of spaced transverse bars on said base members, a pair of clamping plates on the ends of said transverse bars extending generally parallel with and on opposite sides of said first bar, each of said plates having on the end thereof facing toward the first named jaw sockets for engaging the adjacent periphery of the wheel rim, the spacing between said sockets and one of the transverse bars being such as to permit the insertion therebetween of the leverage member of a tire removing tool for engagement with the inside edge of one of said transverse bars, and a bracket fixed on said first bar, an adjusting screw rotatably held in said bracket, a threaded element fixed on the transverse bar nearer to the free end of the first bar, and being movable on said screw when the screw is rotated to move said jaw device sleeve along said first bar.

4. A leverage jack for tire removing tools comprising a bar, a jaw on one end of the bar adapted to engage the outer periphery on one side of a tire wheel rim, a jaw device slidable on said bar and adapted to engage the outer periphery of the other side of said wheel rim, releasable means to clamp said jaws against said opposite sides of the wheel rim and to hold the same in place, said movable jaw device comprising a sleeve slidable longitudinally on said bar, a pair of spaced transverse bars fixedly connected to said sleeve, a pair of clamping plates on the ends of said transverse bars extending generally parallel with and on opposite sides of said first bar, each of said plates having on the edge thereof facing toward the other jaw sockets for engaging the adjacent periphery of the tire wheel rim, the spacing between said transverse bars being such as to permit the insertion therebetween of the leverage member of a tire removing tool for engagement with the inside edge of one of said transverse bars, the transverse bar nearer the free end of the first bar being arcuate with the concave side thereof facing toward said first bar and being spaced farther away from said first bar than the other transverse bar.

5. A leverage jack for tire removing tools comprising a bar, a jaw on one end of the bar adapted to engage the outer periphery on one side of a wheel rim, a jaw device slidable on said bar and adapted to engage the outer periphery of the other side of said wheel rim, releasable means to clamp said jaws against said opposite sides of the wheel rim and to hold the same in place, said movable jaw device including a pair of spaced bars transverse with respect to said first bar, the transverse bar nearer the free end of the first named bar being arcuate with its concave side facing said first named bar, a pair of clamping plates on the ends of said transverse bars extending generally parallel with and on opposite sides of said first bar, each of said plates having a socket on the end thereof facing toward the first named jaw for engagement with the wheel rim, the spacing between said sockets and said arcuate transverse bar being sufficient for the insertion of the leverage member of a tire removing tool therebetween, the inside edge of said arcuate bar providing a leverage abutment for said tool.

(References on following page)

References Cited in the file of this patent

UNITED STATES PATENTS

| | | |
|---|---|---|
| 114,800 | Goodchild | May 16, 1871 |
| 134,428 | Harris | Dec. 31, 1872 |
| 1,003,030 | Burt | Sept. 12, 1911 |
| 1,043,424 | Hevey | Nov. 5, 1912 |
| 1,278,283 | Adamson et al. | Sept. 10, 1918 |
| 1,497,107 | Lasell | June 10, 1924 |
| 1,769,332 | Coffing | July 10, 1930 |
| 2,068,667 | Fischer | Jan. 26, 1937 |
| 2,128,225 | Allen | Aug. 30, 1938 |
| 2,282,148 | Mandl | May 5, 1942 |
| 2,383,591 | Cox | Aug. 28, 1945 |
| 2,404,583 | McCollister | July 23, 1946 |
| 2,476,209 | Monheit | July 12, 1949 |
| 2,545,483 | Martin | Mar. 20, 1951 |